US012761778B2

(12) United States Patent
Kapinos et al.

(10) Patent No.: US 12,761,778 B2
(45) Date of Patent: Oct. 13, 2026

(54) AI-BASED MODELS FOR ASSISTANCE WITH NEAR-REPETITIVE COMPUTER-BASED TASKS

(71) Applicant: Lenovo (Singapore) Pte. Ltd., New Tech Park (SG)

(72) Inventors: Robert J Kapinos, Morrisville, NC (US); Scott Li, Morrisville, NC (US); Robert James Norton, Jr., Morrisville, NC (US); Igor Stolbikov, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 214 days.

(21) Appl. No.: 18/753,358

(22) Filed: Jun. 25, 2024

(65) Prior Publication Data

US 2025/0390204 A1 Dec. 25, 2025

(51) Int. Cl.

| | |
|---|---|
| ***G06F 3/048*** | (2013.01) |
| ***G06F 3/04842*** | (2022.01) |
| ***G06F 3/16*** | (2006.01) |
| ***G06F 11/34*** | (2006.01) |
| ***G06F 40/174*** | (2020.01) |

(52) U.S. Cl.

CPC .......... *G06F 3/04842* (2013.01); *G06F 3/167* (2013.01); *G06F 11/3438* (2013.01); *G06F 40/174* (2020.01)

(58) Field of Classification Search

None

See application file for complete search history.

(56) References Cited

U.S. PATENT DOCUMENTS

| | | | | |
|---|---|---|---|---|
| 2020/0242540 | A1* | 7/2020 | Rosati | G06Q 10/063118 |
| 2023/0281327 | A1* | 9/2023 | Crockett | G06F 21/606 726/26 |
| 2023/0297484 | A1* | 9/2023 | Kabra | G06F 21/31 726/21 |
| 2024/0338233 | A1* | 10/2024 | Bhamidipati | G06F 16/215 |
| 2025/0060863 | A1* | 2/2025 | Sniffen | G06F 3/0484 |

* cited by examiner

*Primary Examiner* — Thanh T Vu

(74) *Attorney, Agent, or Firm* — John M. Rogitz; John L. Rogitz

(57) ABSTRACT

In one aspect, a device includes a processor system and storage accessible to the processor system. The storage includes instructions executable by the processor system to track user inputs as a user interacts with a first graphical user interface (GUI) presented on a display. The instructions are also executable to execute a prediction model to identify a near-repetitive action from the user inputs. Based on the identification of the near-repetitive action, the instructions are executable to present a foreshadow action on the display. The foreshadow action is selectable to command the processor system to autonomously perform a real action corresponding to the foreshadowed action.

17 Claims, 9 Drawing Sheets

AI Architecture For Prediction Model

AI-BASED MODELS FOR ASSISTANCE WITH NEAR-REPETITIVE COMPUTER-BASED TASKS

FIELD

The disclosure below relates to technically inventive, non-routine solutions that are necessarily rooted in computer technology and that produce concrete technical improvements. In particular, the disclosure below relates to artificial intelligence-based models that identify near-repetitive actions and generate foreshadow actions for users.

BACKGROUND

As recognized herein, users often face challenges when engaging in electronic data entry, especially when these activities involve limited quantities of data. For instance, these activities can take an undue amount of time on the part of the user, but the time and effort required to develop and debug a task-specific software tool to help the user often does not justify the potential benefits. This in turn leads to a continued dependence on user entry. Furthermore, present principles recognize that these task-specific software tools are usually only able to do the same exact action over and over again, which is also not suitable for many small-batch data management tasks where there is some variation between successive actions. Accordingly, there are currently no adequate solutions to the foregoing computer-related, technological problem.

SUMMARY

Thus, in one aspect a device includes a processor system and storage accessible to the processor system. The storage includes instructions executable by the processor system to track user inputs as a user interacts with a first graphical user interface (GUI) presented on a display. The instructions are also executable to execute a prediction model to identify a near-repetitive action from the user inputs and, based on the identification of the near-repetitive action, present a foreshadow action on the display. The foreshadow action is selectable by the user to command the processor system to autonomously perform a real action corresponding to the foreshadowed action.

In various example implementations, the near-repetitive action may be established by a same type of user input directed to different locations on the first GUI. Additionally or alternatively, the near-repetitive action may not be a same repeated action at a same location on the first GUI.

In certain examples, the instructions may be executable to track the user inputs as the user sources data from the first GUI and inputs the data to a second GUI different from the first GUI. Here the instructions may then be executable to execute the prediction model to identify the near-repetitive action from the user inputs sourcing the data from the first GUI and inputting the data to the second GUI. The instructions may then be executable to present the foreshadow action on the display based on the identification of the near-repetitive action. In one specific example, the first GUI may be associated with a first spreadsheet and the second GUI may be associated with a second spreadsheet different from the first spreadsheet. In another specific example, the first GUI may be associated with a first word processing document and the second GUI may be associated with a second word processing document different from the first word processing document.

Also in certain examples, the first GUI may be a web-based fillable form, and the instructions may be executable to track the user inputs as the user interacts with the web-based fillable form. Here the instructions may then be executable to execute the prediction model to identify the near-repetitive action from the user inputs, where the near-repetitive action may be established by filling in different input fields of the web-based fillable form. Based on the identification of the near-repetitive action, the instructions may then be executable to present the foreshadow action on the display.

In various non-limiting embodiments, the user inputs may be established by keyboard inputs, mouse button selections, mouse-based cursor directional movement, and/or trackpad inputs. Also in certain non-limiting embodiments, the prediction model may be established by at least one artificial neural network that is trained to make inferences using pattern recognition. What's more, in various examples the foreshadow action may be selectable via voice input, selection of a predetermined key on a keyboard, a predetermined mouse manipulation, and/or selection of a selector presented on the display.

In addition, in certain examples the instructions may be executable to, responsive to identifying, from the user inputs, a threshold number of correct foreshadow actions, present an option that is selectable to command the processor system to auto-complete plural additional near-repetitive actions of the same type as the identified near-repetitive action but without the user having to select additional respective foreshadow actions. The threshold number may be greater than one. Additionally, the respective foreshadow actions may be classified as correct foreshadow actions based on user selection of the respective foreshadow actions.

Also in certain cases, the device may include the display itself.

In another aspect, a method includes tracking user inputs as a user interacts with a first graphical user interface (GUI) presented on a display. The method also includes executing a prediction model to identify, from the user inputs, a same action being directed to different locations of the first GUI. Based on the identification of the same action being directed to different locations of the first GUI, the method includes presenting a predicted action on the display. The predicted action is selectable by the user to provide a command to a device to autonomously perform a real action corresponding to the predicted action.

In certain examples, the same action directed to different locations of the first GUI may be established by a same type of user input directed to different locations on the first GUI. The same type of user input may include a same type of cursor movement, a same type of mouse click, and/or a same type of keyboard command. Also if desired, the same action may be established by a sequence of first input to the first GUI and second input to a second GUI different from the first GUI, where the first GUI may be associated with a first application ("app") and where the second GUI may be associated with a second app different from the first app.

In still another aspect, at least one computer readable storage medium (CRSM) that is not a transitory signal includes instructions. The instructions are executable by a processor system to track user inputs as a user interacts with a first graphical user interface (GUI) presented on a display and to execute a prediction model to infer, from the user inputs, a same action being directed to different locations of the first GUI. The instructions are then executable to, based on the inference of the same action being directed to different locations of the first GUI, present a predicted action on the display. The predicted action is selectable by the user to command the processor system to autonomously perform a real action corresponding to the predicted action.

In various examples, the same action directed to different locations of the first GUI may be established by a same type of user input directed to different spreadsheet cells on the first GUI. Additionally or alternatively, the same action directed to different locations of the first GUI may be established by a same type of user input directed to different input fields of a web-based fillable form that establishes the first GUI.

The details of present principles, both as to their structure and operation, can best be understood in reference to the accompanying drawings, in which like reference numerals refer to like parts, and in which:

DETAILED DESCRIPTION

Figure 1:
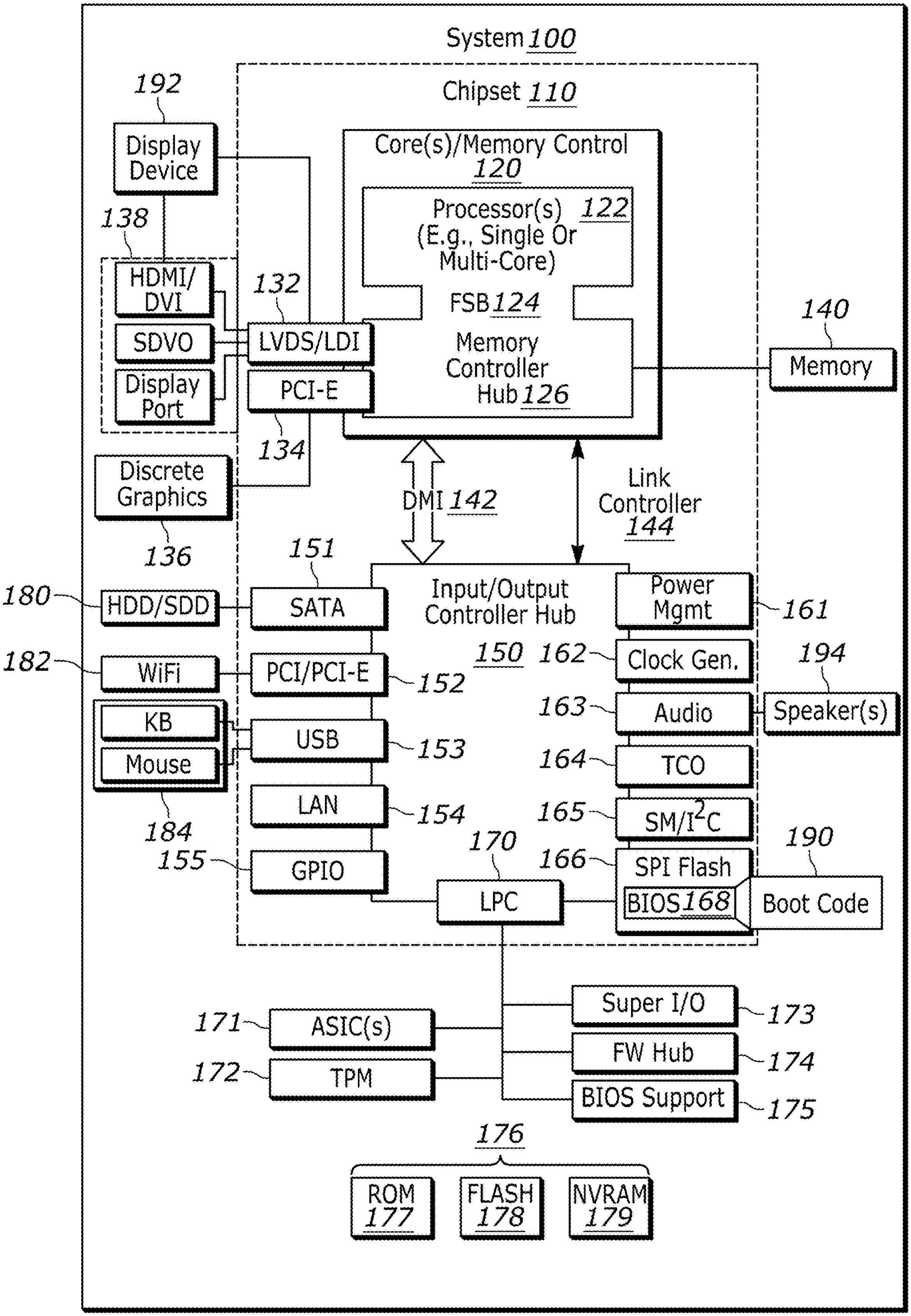
FIG. 1 is a block diagram of an example system consistent with present principles.

Among other things, the detailed description below deals with a software agent that might be always-on and can do the following: Detect real-time repetition and near repetition, analyze the onscreen and data implications of that repetition, and provide helpful "nudges" to assist the user in a look-ahead fashion.

These nudges may be established by different things. For example, one may be a preemptive mouse motion prediction, where the agent displays a mouse shadow or a mouse move is projected on the user's screen where the agent predicts the user will go next, and the user can just accept that and the agent can then do the mouse motion for the user.

As another example, the agent can be a mouse targeting precision agent where the user moves the mouse near where the user wants the cursor to be but not exactly at the desired (and predicted) location, and the agent can then do the fine locational adjustment of where the agent thinks the user ultimately wants the cursor to be so that the user can then accept or not accept that projection.

As yet another example, the agent can do pre-highlighting of what the user is going to click on next, and the user could then do the click (e.g., left-button mouse selection) without ever moving the mouse to the selection location, with the agent then accepting the mouse click even though the cursor controlled by the same mouse is presented at an unrelated location.

As yet another example, the agent may perform preemptive data moving, where the agent can go ahead and, before the user does the action, populate the device/operating system's virtual clipboard with certain data the user wants to move (and/or populate the drag and drop operation with the data the user wants to move). Then the user can just accept that prediction and the agent may put/insert the data where the data has already been predicted for placement. The agent may even populate the data field in a shadow manner and the user can just accept that, eliminating mouse movement entirely for this operation.

As a specific example of use and user interaction, consider that a user has open a word processing document and a spreadsheet. The user is copying the word processing document headers into arranged cells in the spreadsheet. After the user does this three times, the software agent flags the user's actions as repeatable and potentially assisted. This is made possible because the agent has data access to the two apps to figure out what data is in them (e.g., both in terms of data format and layout as well as content). The agent may then use its AI to predict the user's next actions, both at the level of mouse and keyboard movement and at the level of data moved. The agent may then project its predictions on the screen in the fashion of a lookahead keyboard using the predicted actions. For example, a mouse shadow may occur over the next place the mouse is predicted to be placed and clicked. The user can then type a keyboard shortcut or select a designated extra mouse button to accept the movement prediction. Additionally, as the user moves his mouse back to the word processing document, the predicted next target is highlighted. The user can then press control-C at that time to accept the predicted text for copying. Similarly, the agent can provide a prediction of the pasted text into the spreadsheet. The user can then just press Control-V to accept the prediction.

In certain instances, the agent can also do a "full" method prediction, highlighting both the source and target data areas so that the user need only accept the action by a button or keypress per this example.

Thus, in one aspect present principles deal with systems and methods to capture associated user actions, screen changes, and program data alterations, which can then be analyzed for repetitive similarity and used to predict a user's next action using reflective neural networks and other AI models. If desired, the prediction step may be instantiated as a real step in response to the user accepting a predictive prompt. Additionally, in some examples user input from which patterns can be recognize includes not just inputs to screen presentations but also tap gestures in a certain place on a touch-enabled display screen and/or voice input from a user speaking into a microphone.

Also in one aspect, an AI software agent may notice things in a screen-predictable manner based on the user's use of the screen. The agent knows all the points on the screen that were interacted with, and what data is at those locations, and the agent can figure out using its artificial intelligence what that relationship is. So since the agent knows what the source of that data is programmatically, the agent can ask that source how the data is arranged and what the next values are. The agent can then make predictions based on the user's prior actions and what else the agent can see onscreen. If the user denies a recommendation, the agent assumes the recommendation was wrong and that the prediction itself was wrong (e.g., based on the analysis being wrong). So the AI can continue to be trained during deployment based on false positives and false rejections from the user.

Also in one aspect, the agent may establish an AI pattern extractor that extracts patterns from the user's input motions. The agent can identify the pattern via a statistical analysis within a curve, and if the action falls within a certain normal variance, then it meets the threshold for prediction. Additionally or alternatively, the agent may do a Bayesian analysis where the agent compares the actions against a template of a bunch of potential actions to make a prediction. Still further, the agent may make predictions using a rules-based algorithm (e.g., if the coordinates for the mouse's location are moving in a vertical row, the agent determines this to be a repetitive action if the action is the same to within five pixels each time). Pretrained AI may also be used.

The predictions that are presented onscreen may not last very long, possibly a threshold time of a few seconds to give the user time to accept, and then the predictions may be removed from the display or otherwise disappear if not accepted. Also, if the user does not accept the prediction within the time threshold, the agent would go back to background processing of the user's motions/inputs. Then when the agent gets to a threshold level of confidence again, the agent can give another recommendation/prediction.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used, as may a Chrome or Android or Windows or macOS operating system. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor such as a central processing unit (CPU), a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in the art. Where employed, the software instructions may also be embodied in a non-transitory device that is being vended and/or provided, and that is not a transitory, propagating signal and/or a signal per se. For instance, the non-transitory device may be or include a hard disk drive, solid state drive, or CD ROM. Flash drives may also be used for storing the instructions. Additionally, the software code instructions may also be downloaded over the Internet (e.g., as part of an application ("app") or software file). Accordingly, it is to be understood that although a software application for undertaking present principles may be vended with a device such as the system 100 described below, such an application may also be downloaded from a server to a device over a network such as the Internet. An application can also run on a server and associated presentations may be displayed through a browser (and/or through a dedicated companion app) on a client device in communication with the server.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a hard disk drive (HDD) or solid state drive (SSD), a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "a" or "an" in reference to an entity refers to one or more of that entity. As such, the terms "a" or "an", "one or more", and "at least one" can be used interchangeably herein.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. The term "circuitry"

includes all levels of available integration, e.g., from discrete logic circuits to the highest level of circuit integration such as VLSI, and includes programmable logic components programmed to perform the functions of an embodiment as well as processors (e.g., special-purpose processors) programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 includes a processor system 122 (e.g., one or more single core or multi-core processors, etc.) and a memory controller hub 126 that exchange information via a front side bus (FSB) 124. A processor system such as the system 122 may therefore include one or more processors acting independently or in concert with each other to execute an algorithm, whether those processors are in one device or more than one device. Additionally, as described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one or more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 and/or PCI-E interface 152 provide for reading, writing or reading and writing information on one or more drives 180 such as HDDs, SSDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor system 122, an accelerometer that senses acceleration and/or movement of the system 100 and provides related input to the processor system 122, and/or a magnetometer that senses and/or measures directional movement of the system 100 and provides related input to the processor system 122. Still further, the system 100 may include an audio receiver/microphone that provides input from the microphone to the processor system 122 based on audio that is detected, such as via a user providing audible input to the microphone. The system 100 may also include a camera that gathers one or more images and provides the images and related input (e.g., metadata like an image timestamp) to the processor system 122. The camera may be a thermal imaging camera, an infrared (IR) camera, a digital camera such as a webcam, a three-dimensional (3D) camera, and/or a camera otherwise integrated into the system 100 and controllable by the processor system 122 to gather still images and/or video. Also, the system 100 may include a global positioning system (GPS) transceiver that is configured to communicate with satellites to receive/identify geographic position information and provide the geographic position information to the processor system 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network trained through machine learning may thus include an input layer, an output layer, and multiple hidden layers in between that are configured and weighted to make inferences about an appropriate output.

Figure 2:
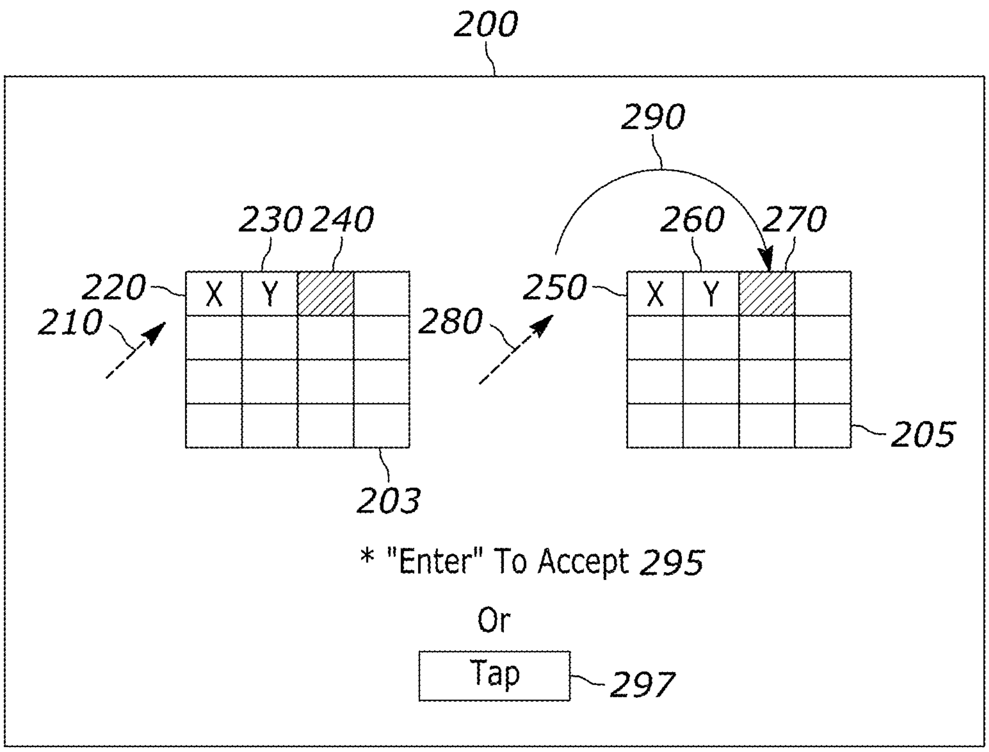
FIGS. 2 and 3 show example screen layouts demonstrating different functions of an artificial intelligence (AI) model when detecting near-repetitive actions consistent with present principles.

Turning now to FIG. 2, an electronic display 200 is shown, such as a touch-enabled light emitting diode (LED) display. As also shown in FIG. 2, the display 200 is being used by an end-user to copy data from respective cells in a first spreadsheet 203 and to insert/paste the data into respective cells in a second spreadsheet 205, with the spreadsheets 203, 205 respectively establishing first and second graphical user interfaces (GUIs) consistent with present principles. The user is doing so in the present instance by controlling a cursor 210 to select a respective cell from the spreadsheet 203 and then providing a copy command (e.g., Ctrl C keyboard command), with the user then moving the cursor 210 to select a respective cell from the spreadsheet 205 and then providing a paste command (e.g., Ctrl Z keyboard command) to paste the copied data into the respective cell in the spreadsheet 205. The user might then continue this near-repetitive action, copying different data from another (different) cell in the spreadsheet 203 and pasting that different data into another (different) cell in the spreadsheet 205.

To illustrate, as shown in FIG. 2 the user has copied data from a first cell 220 in the spreadsheet 203 and pasted it into a first cell 250 in the spreadsheet 205. The user has also copied data from a second cell 230 in the spreadsheet 203 and pasted that second data into a second cell 260 in the spreadsheet 205.

Also note that an artificial intelligence (AI)-based model may be executing in the background as a computer process while the user performs these tasks. The AI-based model may therefore track these near-repetitive actions and, responsive to identifying the near-repetitive action occurring a threshold number of times (e.g., at least two times to minimize false positives), the model may infer a foreshadow action. The model itself may be a reflective neural network, for example. The foreshadow action may be a predicted next action where different data is copied from a different cell than the cells 220, 230 and then pasted into a different cell than the cells 250, 260 (with the cells 220, 230, 250, and 260 already having user input directed to them but the different (third) cells not yet having user input directed to them in this data entry instance).

Responsive to identifying as much, the AI-based model may control the display 200 to present a foreshadow action, as represented by graphical elements 280 and 290 shown on the display 200. The foreshadow action in the present instance is a copying of data from a third cell 240 and a pasting of the data into cell 270. Accordingly, foreshadow action indication 280 may be a ghost cursor that is presented with a certain level of transparency that is more transparent than the actual cursor 210 as presented on the display but still not completely transparent (and hence is still visible), illustrating to the user a predicted future position for the cursor 210 during the predicted upcoming copy/paste action. The foreshadow action indication 290 may be a guide arrow 290 indicating that the third cell 270 on the spreadsheet 205 is the one to which a predicted next near-repetitive paste action will be directed based on a predicted future mouse selection. Additionally, third and fourth foreshadow action indications are illustrated via the highlighting of the cells 240, 270 as also shown in FIG. 2, illustrating to the user that data will be sourced from cell 240 and placed in cell 270 as part of a predicted action.

The foreshadow action itself may then be selected by the user to provide a command to the AI model to autonomously perform a real action corresponding to the foreshadowed action. Here that entails the user selecting the foreshadow action to source data already existing in cell 240 and pasting that data into cell 270. As such, a prompt 295 may be presented on the display 200, with the prompt 295 indicating that the user can select the enter key on the user's keyboard (hard or soft) to accept the predicted action, which will then be converted into a real action performed autonomously by the AI model. A selector 297 may also be presented on the display 200, with the selector 297 being selectable via touch input to the display location at which the selector 297 is presented to provide another type of user input accepting/selecting the predicted action.

Figure 3:
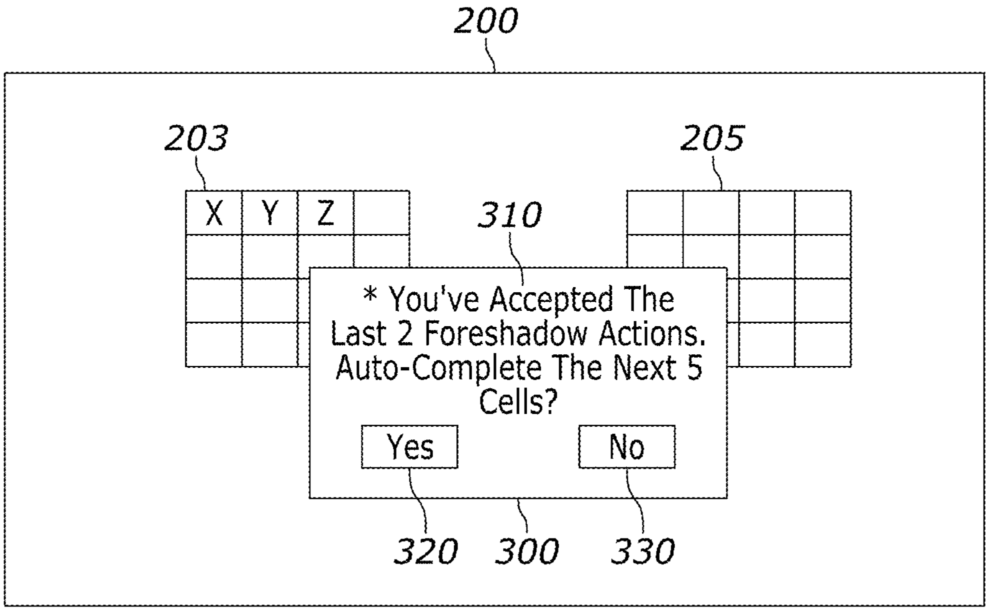

Turning to FIG. 3, now suppose the AI model has predicted, and the user accepted, a threshold number of consecutive foreshadow actions, implying correctly-inferred foreshadow actions by the AI model. The AI model may therefore be further configured so that, when this threshold number of consecutive foreshadow actions is reached (with the AI model correctly inferring the foreshadow actions), a prompt 310 may be presented on the display 200.

As shown in FIG. 3, the prompt 310 indicates via text that the end-user has accepted the last two foreshadow actions and also asks if the user wants the AI model to auto-complete foreshadow actions for the next five cells in the spreadsheet 205 (where different data is pasted into the spreadsheet 205 as sourced from a different respective cell in the spreadsheet 203 for each auto-complete foreshadow action). As such, the prompt 310 may present an option 320 in the form of a "yes" selector that is selectable to command the AI model to auto-complete the five additional near-repetitive actions of the same type but without the user having to select additional respective foreshadow actions for each auto-complete per FIG. 2 as described above. The AI model may then actually do so responsive to selection of the option 320, converting the five foreshadow actions into real actions. However, if for some reason the user does not wish the AI model to auto-complete the next five predicted actions, the user may instead select the selector 330 to provide a no command and dismiss the prompt 310 so that the user can go back to manipulating the spreadsheets 203, 205.

Figure 4:
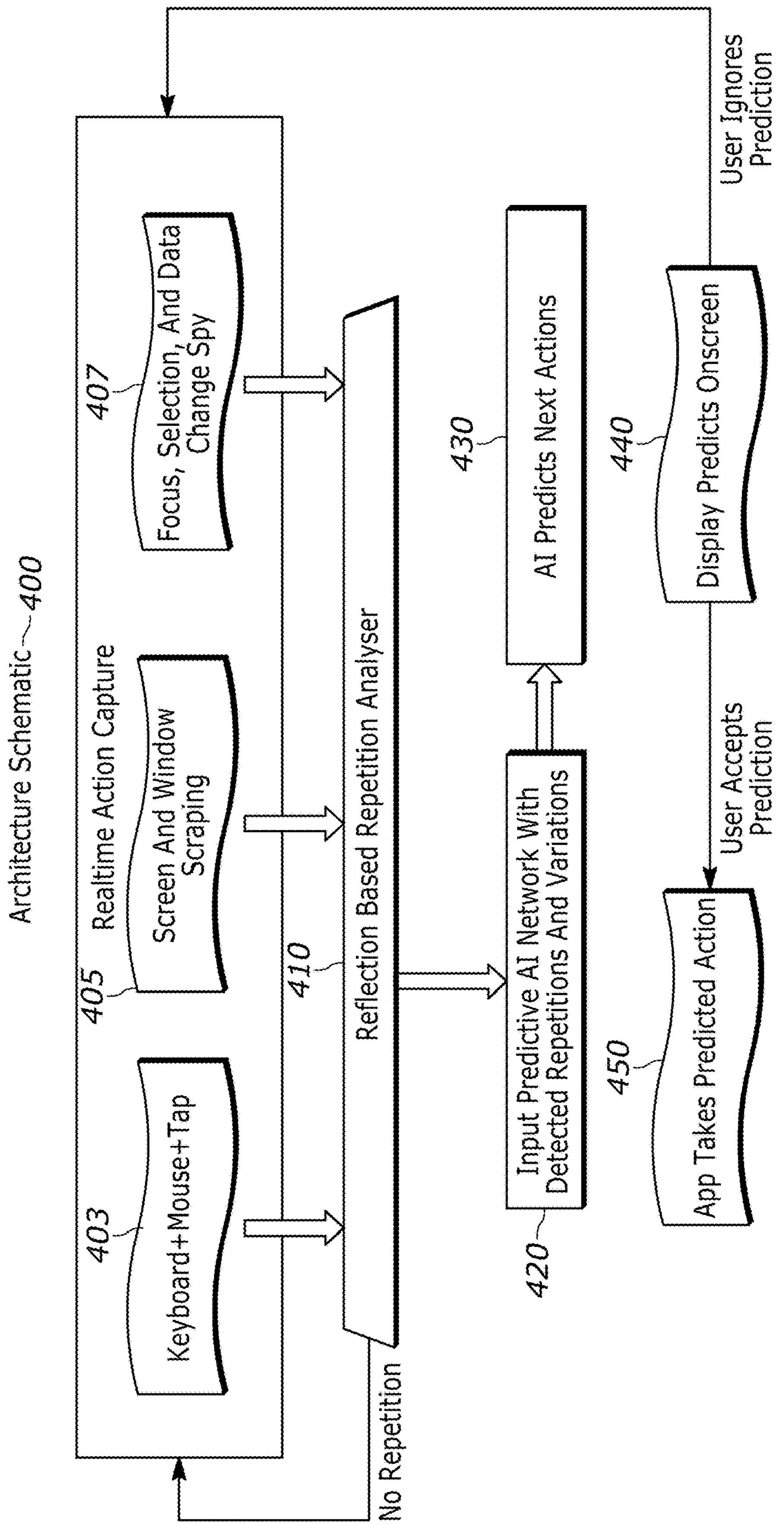
FIG. 4 shows a schematic of example software architecture that may be used consistent with present principles.

Turning to FIG. 4, this figure shows a schematic of software architecture that may be used consistent with present principles. Box 400 denotes a software module that performs real time action capture of user input actions. As such, this software module 400 may include an input device input tracker 403 that detects user inputs to a keyboard, mouse, display screen, laptop track pad, etc. The module may also include a screen and window scraper 405 that uses one or more screen scraping algorithms to identify content/data presented on the user's display.

The module may further include a focus, selection, and data change spy 407 that tracks changes in the system user experience (UX) state and monitors actual program change data. Each program/application for which UX changes and program change data are monitored may use an application programming interface (API) to notify the spy 407 of changes. The API may use data interchange protocols such as DDE, COM, REST. An app contract may be provided to snoop things like inspecting the data contents of the app's onscreen control windows. Any API that applications or the OS support and the spy 407 can apply to identify the app presentation data can be used. Thus, through the APIs, the spy 407 may identify which program elements get acted upon based on the system UX state and identify as much as it can about what changed in that program/app. This allows the system to suggest changes that extend beyond the screen as well as doing screen-oriented predictions.

Inputs from each of the tracker 403, scraper 405, and spy 407 may then be provided to a reflection-based repetition analyzer 410, which itself may be an AI-based model consistent with present principles. Responsive to identifying no repetition, the analyzer 410 may continue to receive inputs from the tracker 403, scraper 405, and spy 407 for subsequent user input sequences until a near-repetitive action is identified.

Once a near-repetitive action is identified, as part of execution of the analyzer 410, at step 420 the analyzer 410 may provide input to a predictive AI network (e.g., artificial neural network) that forms part of the analyzer 410. The input indicates the detected near-repetitive action as well as inferred potential variations of the near-repetitive action. Then at step 430 the AI network may predict/infer a next action in the user's near-repetitive action sequence to, at step 440, display the prediction action(s) onscreen to a user (such as by presenting the foreshadow actions discussed above in reference to FIG. 2).

Then as the bottom of FIG. 4 illustrates, if the user ignores the prediction or dismisses it, the architecture's processing may return to real time action capture 400 to subsequently attempt to identify another near-repetitive action and corresponding predicted next action. However, if the user accepts the prediction, at step 450 the AI model (e.g., generally, an application or "app") may execute the predicted action itself, performing it as a real action. The real action might be, using the example of FIG. 2, sourcing data from the cell 240 and inserting it into cell 270 and then saving the spreadsheet 270 in RAM and/or its existing persistent storage location so that the data insertion into the cell 270 is saved.

Figure 5:
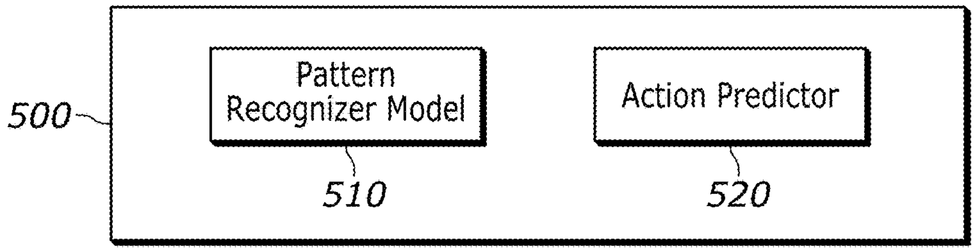
FIG. 5 shows example artificial intelligence (AI) architecture that may be used consistent with present principles.

Continuing the detailed description in reference to FIG. 5, this figure shows example AI architecture 500 that may be implemented consistent with present principles. The architecture 500 includes a (discriminative) pattern recognizer model 510 which may be established by one or more convolutional neural networks and/or recurrent neural networks (more generally, one or more deep artificial neural networks) that have been configured for pattern recognition. In various examples, the model 510 may be trained prior to deployment in supervised fashion using a dataset having pairs of user input(s) and corresponding ground truth labels for an associated pattern. Semi-supervised learning, unsupervised learning, reinforcement learning, and other types of machine learning may also be used to train the model 510.

FIG. 5 also shows that the architecture 500 may include an action predictor 520 that may be a (generative) AI model configured for predicting future near-repetitive actions based on input patterns recognized by the pattern recognizer model 510. As such, the predictor 520 may be established by a generative pretrained transformer model, a reflective network model, a forecast model, a time series model, and/or another machine learning-based AI model. In various examples, the model 520 may be trained prior to deployment in supervised fashion using a dataset having pairs of inferred patterns (and even current onscreen data) and corresponding ground truth labels for an associated next near-repetitive action that is to occur based on the recognized (past) pattern (and currently-presented screen data). Semi-supervised learning, unsupervised learning, reinforcement learning, and other types of machine learning may also be used to train the model 520.

Thus, in one aspect, user inputs may be fed into the model 510 as input for the model 510 to infer one or more patterns from a group of inputs (e.g., all received within a threshold time of each other, such as ten seconds, to minimize false positives). The pattern inference output by the model 510 may then be provided as input to the action predictor 520 along with screen-scraped visual data as described above for the predictor 520 to then output a predicted next action that the user will perform based on the past pattern and current screen data.

Figure 6:
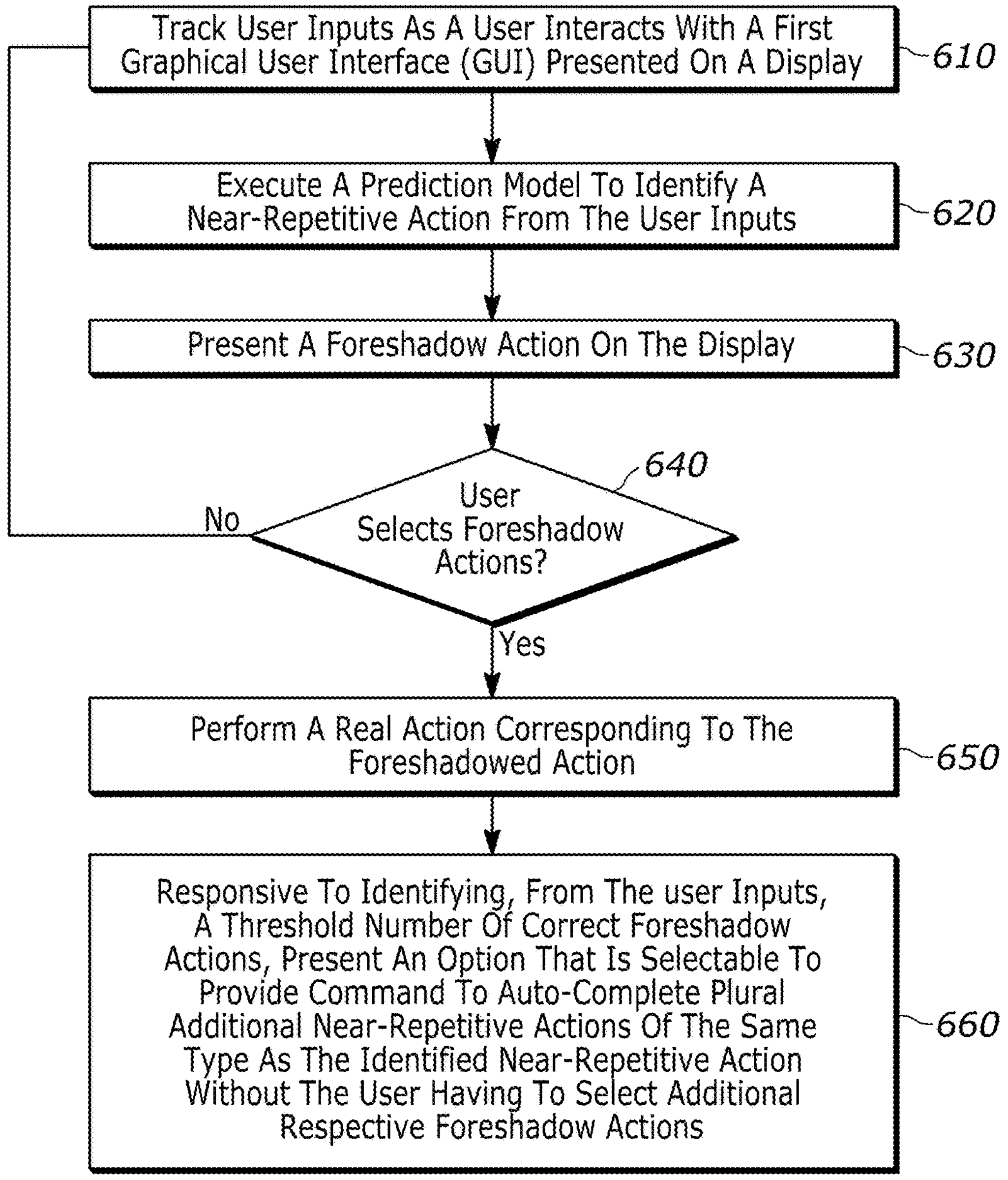
FIG. 6 illustrates example logic in example flow chart format that may be executed by a device consistent with present principles.

Now in reference to FIG. 6, it shows example logic that may be executed by a device/processor system consistent with present principles. Thus, note that the steps of FIG. 6 may be executed alone or in any appropriate combination by a client device and/or remotely-located server. Also note that while the logic of FIG. 6 is shown in flow chart format, other suitable logic may also be used.

Beginning at block 610, the device may track user inputs as a user interacts with a first graphical user interface (GUI) presented on a display. The logic may then proceed to block 620 where the device may execute a prediction model to identify a near-repetitive action from the user inputs, where the prediction model may be established by some or all of the architecture 500 of FIG. 5 in various examples. More generally, the prediction model may be established by at least one artificial neural network that is trained to make pattern recognition inferences. The near-repetitive action itself may be established by a same type of user input directed to different locations on the first GUI, where the near-repetitive action is also not a same repeated action at a same location on the first GUI. Thus, using the example of FIG. 2 above, the near-repetitive action may be a same action(s) but not directed to the same spreadsheet cells each time, the same types of actions (e.g., copy and paste commands or other keyboard commands, cursor movement, mouse clicks, etc.) being instead directed in a progressive pattern to subsequent cells and hence different GUI locations as time goes on.

Then at block 630 based on the identification of the same action being directed to different locations of the relevant GUI, the device may present a foreshadow action (predicted next action) on the display. The foreshadow action may be selectable by the user to command the device to autonomously perform a real action corresponding to the foreshadowed action. Thus, at decision diamond 640 the device may determine whether the user has in fact selected the foreshadowed action. A negative determination at diamond 640 may cause the logic to revert back to block 610 to proceed again therefrom.

However, an affirmative determination may instead cause the logic to proceed to block 650. At block 650 the device may autonomously perform a real action corresponding to the foreshadow (predicted) action itself, converting the foreshadowed action into a real action where the predicted action is actually performed and then saved into computer memory.

From block 650 the logic may then proceed to block 660. In non-limiting examples, at block 660 the device may, responsive to identifying a threshold number of correct foreshadow actions from the user inputs, present an option that is selectable to command the processor system to auto-complete plural additional near-repetitive actions of the same type as the identified near-repetitive action but without the user having to select additional respective foreshadow actions for each one. The threshold number may be greater than one to reduce false positives. Thus, respective foreshadow actions may be classified as correct foreshadow actions based on user selection of the respective foreshadow actions and then, once a threshold number of correct foreshadow actions and user acceptances has been reached, the device may subsequently auto-complete the next foreshadow actions, converting them into real actions for other data elements also currently presented on the display. But to also minimize device errors, the device may not convert foreshadow actions into real actions for data elements that are not currently presented on screen (but that might still form part of the same spreadsheet or other file and that can be presented based on a scroll command or keyboard arrow command, for example).

Thus, according to FIG. 6 and providing an example consistent with FIG. 2 above, the device may track user inputs as the user sources data from a first GUI (the spreadsheet 203) and inputs the data to a second GUI (the spreadsheet 205) that is different from the first GUI. The device may then execute the prediction model to identify the near-repetitive action from the user inputs sourcing the data from the first GUI and inputting the data to the second GUI to, based on the identification of the near-repetitive action, present the foreshadow action on the display.

As another example, the device may track user inputs as the user sources data from a first word processing document and inputs the data to a second, different word processing document. The device may then execute the prediction model to identify the near-repetitive action from the user inputs sourcing the data from the first word processing document and inputting the data to the second word processing document to, based on the identification of the near-repetitive action, present a foreshadow action on the display for a next predicted action to execute in relation to the first and second word processing documents.

As still another example, the device may track the user inputs as the user interacts with a web-based fillable form presented through a web browser app and then execute the prediction model to identify a near-repetitive action from the user inputs, where the near-repetitive action is established by filling in different input fields of the web-based fillable form. The fillable form might be a registration form, a form to create an online account, a form at which shipping info is entered for an e-commerce transaction where a good is being shipped to the user, etc. Based on the identification of the near-repetitive action, the device may then present the associated foreshadow action on the display. Thus, per this example the near-repetitive action is selecting a next-lowest-appearing input field in the web-based fillable form (after inputting data to a higher-up field), and then entering corresponding data for that next-lowest field, where the data is being sourced from web browser user data or another app that the user is using to copy the relevant data for each input field (e.g., word processing app, notepad app, email app, etc.). The device may thus identify from screen scraping and/or metadata for the fillable form the type of data to which a given input field applies to then predict a foreshadow action for that field, where different data corresponding to that field may be auto-filled based on the existing web browser data/different app used by the user to source previous data previously pasted into higher-up fields of the same form.

Figure 7:
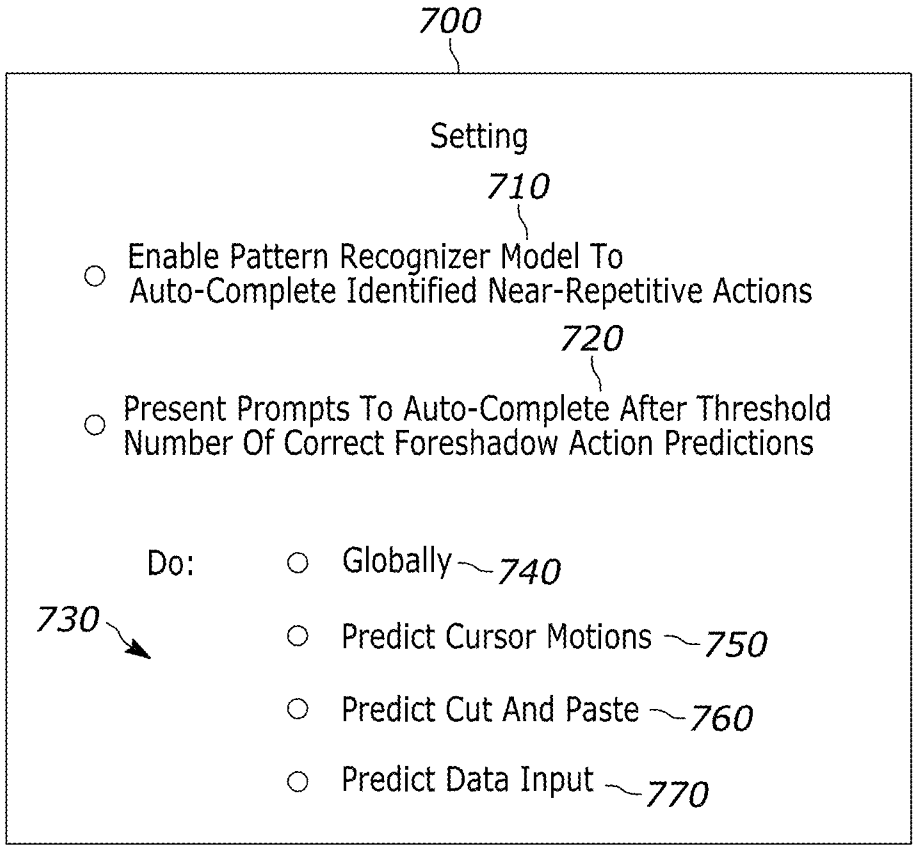
FIG. 7 shows an example settings graphical user interface (GUI) consistent with present principles.

Also note before moving on to the description of FIG. 7 that example user inputs from which a near-repetitive pattern may be recognized include keyboard inputs, mouse button selections (e.g., left click button or right click button), mouse-based cursor directional movement, and/or laptop trackpad inputs, among others. Also note that the foreshadow action itself may be selectable via voice input (e.g., voice command "accept"), a predetermined key on a keyboard being pressed (e.g., a hotkey), a predetermined mouse manipulation (e.g., either mouse movement and/or right or left click), selection of a selector presented on the display, etc.

Continuing the detailed description in reference to FIG. 7, it shows an example GUI 700 that may be presented on a display for an end-user to configure one or more settings of a device to operate consistent with present principles. The GUI 700 may be presented as part of an operating system settings screen, AI app settings screen, or other settings screen.

As shown in FIG. 7, the GUI 700 may include a first option 710 that is selectable a single time to set or configure the device to, for multiple future data manipulation instances, use a pattern recognizer model to help auto-complete fields for the user based on identified near-repetitive actions. Accordingly, the option 710 may be selected to set or enable the device to undertake the functions described above with respect to FIGS. 2-6.

The GUI 700 may also include an option 720. The option 720 may be selectable to set or enable the device to specifically present prompts to an end-user to auto-complete additional near-repetitive actions responsive to a threshold number of correct (previous) foreshadow action predictions being accepted. Thus, selection of the option 720 may set or configure the device to undertake actions set forth above specifically in reference to FIG. 3 (e.g., presentation of the prompt 300 and ensuing command execution responsive to selection of the selector 320).

If desired, the GUI 700 may also include settings 730 for the user to configure the AI model to execute globally for all types of near-repetitive user actions executed at the user's client device (option 740), specifically for predicting cursor motions (option 750), specifically for predicting for cut and paste actions (option 760), and specifically for predicting data input operations (option 770). Other near-repetitive actions may also be listed as options for the setting 730. And note that more than one of the options 750-770 may be concurrently selected.

Figure 8:
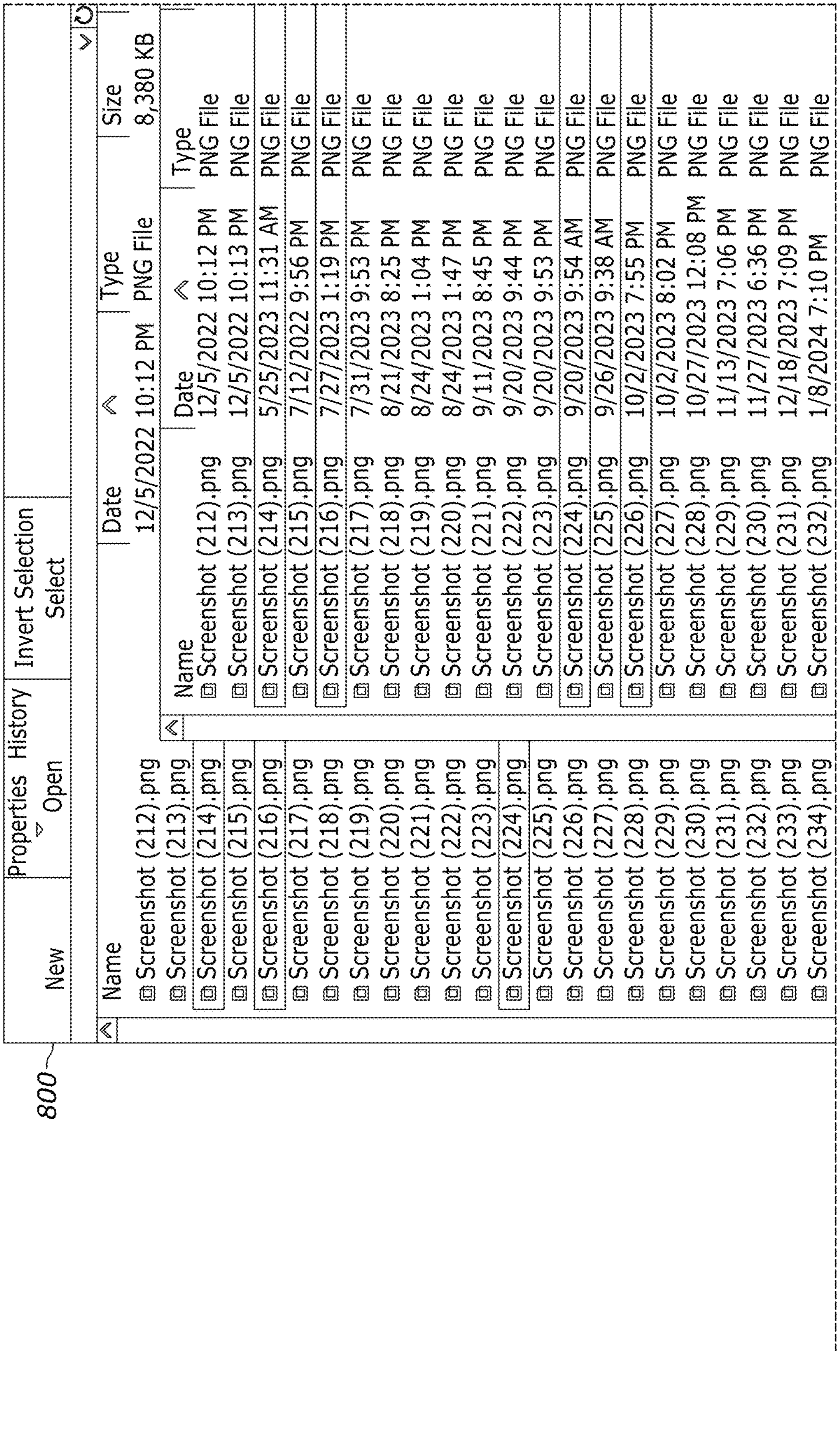
FIG. 8 shows another illustration of present principles in terms of files in a file browser that are being selected.
Figure 8:
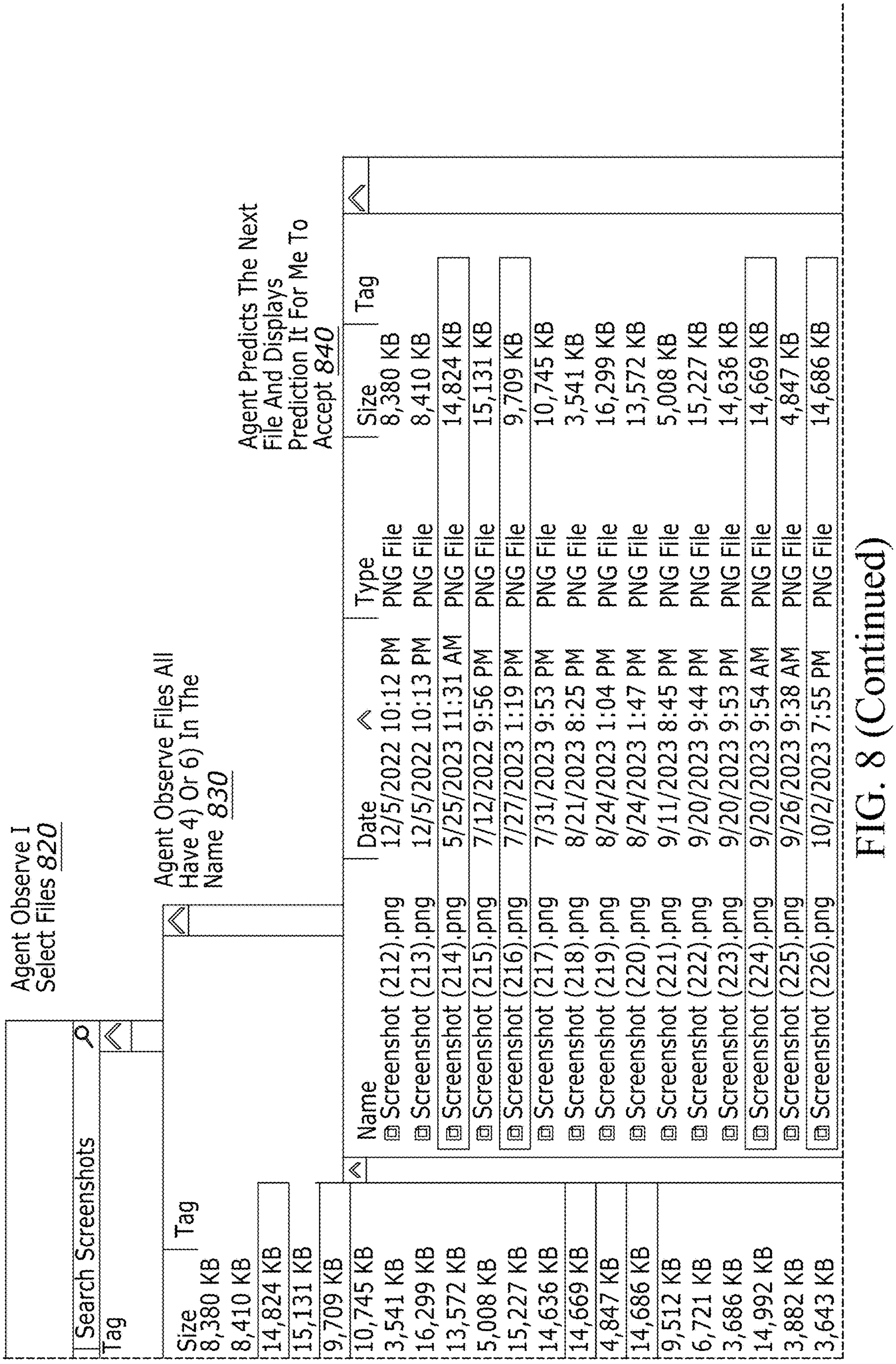
Figure 8:
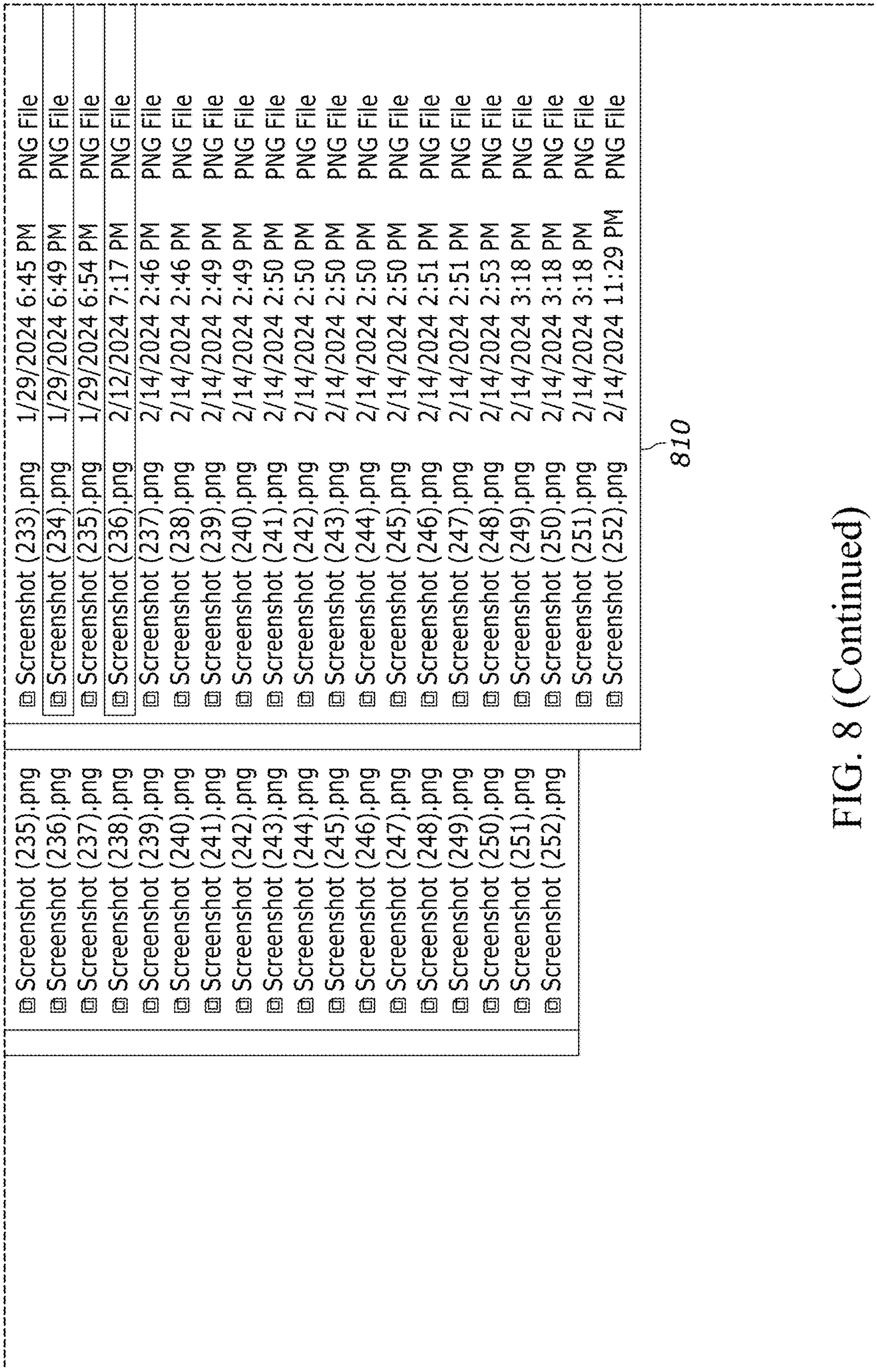
Figure 8:
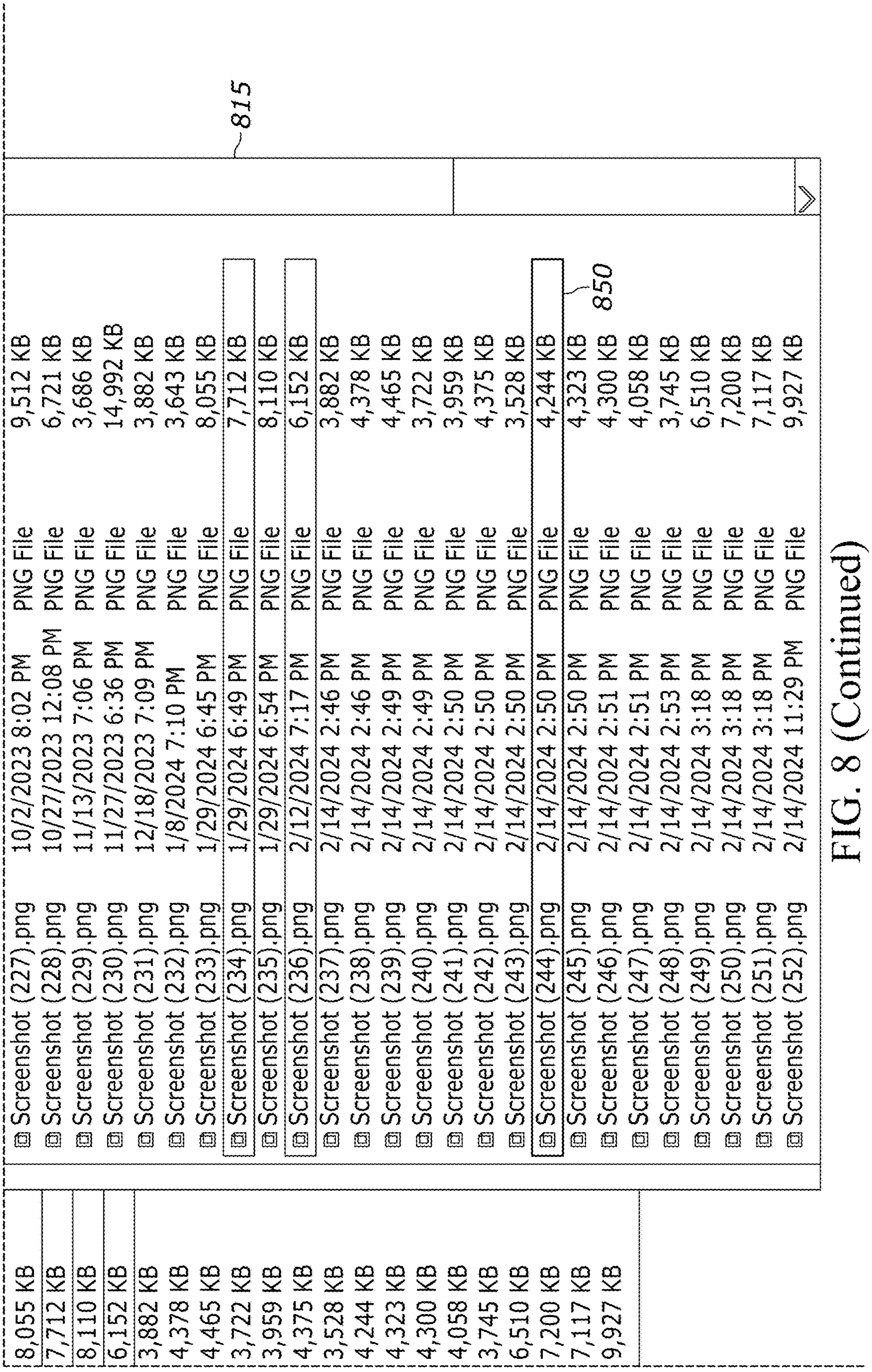

Turning now to FIG. 8, this figure shows another illustration of present principles in relation to files in a file browser that are being selected. In the example of FIG. 8, the spy 407 shown in FIG. 4 can select all the files from the whole list, not just those that are shown onscreen. So, for example, in some cases the user screen change may be detailed and important but the data change is trivial, whereas cases could also exist where the user's data manipulation is detailed but the screen changes are not. The scraper 405 may identify the former, while the spy 407 may identify the latter. Accordingly, part of the AI training discussed herein may be to identify which of these inputs is sparse, and predict accordingly.

With respect to FIG. 8 in greater detail, the same file browser is shown at three different stages 800, 810, and 815. At stage 800, an AI model/software agent operating consistent with present principles tracks the user's inputs and identifies the user as selecting certain files as denoted by element 820.

Then at stage 810 the AI model/software agent continues to track the user's inputs and identifies that the user is selecting files that all each have the number four and/or the number six in the filename, as denoted by element 830. Last, at stage 815 the AI model/software agent predicts a next file that will be selected as denoted by element 840, with filename ghost selection (e.g., red highlighting) 850 indicating a foreshadow action in the form of a provisional selection of the next file down the filename list that has the number four or six in the filename itself.

It may now be appreciated that present principles provide for an improved computer-based user interface that increases the functionality and ease of use of the devices disclosed herein. The disclosed concepts are rooted in computer technology for computers to carry out their functions.

Components included in one embodiment can be used in other embodiments in any appropriate combination. For example, any of the various components described herein and/or depicted in the Figures may be combined, interchanged or excluded from other embodiments.

It is to be understood that whilst present principals have been described with reference to some example embodiments, these are not intended to be limiting, and that various alternative arrangements may be used to implement the subject matter claimed herein. Accordingly, while particular techniques and devices are herein shown and described in detail, it is to be understood that the subject matter which is encompassed by the present application is limited only by the claims.

What is claimed is:

1. A device, comprising:

a processor system; and storage accessible to the processor system and comprising instructions executable by the processor system to:

receive first input from a first application programming interface (API), the first input indicating one or more input actions to a first application as monitored by the first API;

receive second input from a second API, the second input indicating one or more input actions to a second application as monitored by the second API, the second API being different from the first API, the second application being different from the first application;

determine that the first and second inputs have been received within a threshold amount of time;

based on the determination, execute a prediction model to identify, from the first and second inputs, a near-repetitive action; and based on the identification of the near-repetitive action, present a foreshadow action on a display, the foreshadow action being selectable by the user to command the processor system to autonomously perform a real action corresponding to the foreshadowed action.

2. The device of claim 1, wherein the near-repetitive action is not a same repeated action at a same location.

3. The device of claim 1, wherein one or more of the first and second inputs are established by one or more of: mouse button selections, mouse-based cursor directional movement.

4. The device of claim 1, wherein the prediction model is established at least in part by a reflective neural network that is trained to make inferences using pattern recognition.

5. The device of claim 1, wherein the foreshadow action is selectable via voice input.

6. The device of claim 1, wherein the instructions are executable to:

responsive to identifying a threshold number of correct foreshadow actions, present an option that is selectable to command the processor system to auto-complete plural additional near-repetitive actions of the same type as the identified near-repetitive action but without the user having to select additional respective foreshadow actions, the threshold number being greater than one.

7. The device of claim 6, wherein respective foreshadow actions are classified as correct foreshadow actions based on user selection of the respective foreshadow actions.

8. The device of claim 1, comprising the display.

9. The device of claim 1, wherein the instructions are executable to execute a screen scraping algorithm to track the first and second inputs as the user interacts with the first and second applications.

10. A method, comprising:

receiving first input from a first application programming interface (API), the first input indicating one or more input actions to a first application as monitored by the first API;

receiving second input from a second API, the second input indicating one or more input actions to a second application as monitored by the second API, the second API being different from the first API, the second application being different from the first application;

determining that the one or more input actions to the first and second applications have been received within a threshold amount of time;

based on the determination, executing a prediction model to identify, from the first and second inputs, a same action being directed to different locations of a graphical user interface (GUI); and based on the identification of the same action being directed to different locations of the GUI, presenting a predicted action on a display, the predicted action being selectable by the user to provide a command to a device to autonomously perform a real action corresponding to the predicted action.

11. The method of claim 10, wherein the same action directed to different locations of the GUI is established by a same type of user input directed to different locations on the GUI.

12. The method of claim 11, wherein the same type of user input comprises a same type of cursor movement.

13. The method of claim 10, wherein the prediction model is established at least in part by a reflective neural network.

14. An apparatus, comprising:

at least one computer readable storage medium (CRSM) that is not a transitory signal, the at least one CRSM comprising instructions executable by a processor system to:

receive first input from a first application programming interface (API), the first input indicating one or more input actions to a first application as monitored by the first API;

receive second input from a second API, the second input indicating one or more input actions to a second application as monitored by the second API, the second API being different from the first API, the second application being different from the first application;

execute a screen scraping algorithm to track the one or more input actions to the first and second applications as a user interacts with the first and second applications;

execute a prediction model to infer, from the one or more input actions to the first and second applications, a same type of action being performed by the user, the prediction model established at least in part by a reflective neural network; and based on the inference of the same type of action being performed by the user, present a predicted action on a display, the predicted action being selectable by the user to command the processor system to autonomously perform a real action corresponding to the predicted action.

15. The apparatus of claim 14, wherein the instructions are executable to:

determine that the one or more input actions to the first and second applications have been received within a threshold amount of time; and based on the determination, execute the prediction model to infer the same type of action.

16. The apparatus of claim 14, comprising the processor system.

17. The apparatus of claim 16, comprising the display.

* * * * *